United States Patent
Lee

(10) Patent No.: US 11,302,504 B2
(45) Date of Patent: Apr. 12, 2022

(54) FUSE CONTROL SYSTEM AND METHOD USING DEFECTIVE MODE DETECTION

(71) Applicant: LG Chem, Ltd., Seoul (KR)

(72) Inventor: Jae Chan Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/957,816

(22) PCT Filed: Aug. 5, 2019

(86) PCT No.: PCT/KR2019/009708
§ 371 (c)(1),
(2) Date: Jun. 25, 2020

(87) PCT Pub. No.: WO2020/045842
PCT Pub. Date: Mar. 5, 2020

(65) Prior Publication Data
US 2021/0066907 A1    Mar. 4, 2021

(30) Foreign Application Priority Data
Aug. 31, 2018 (KR) .................. 10-2018-0103915

(51) Int. Cl.
*H01H 85/00* (2006.01)
*H02H 3/02* (2006.01)
(Continued)

(52) U.S. Cl.
CPC ........ *H01H 85/0047* (2013.01); *H02H 3/021* (2013.01); *H02H 3/10* (2013.01); *H02H 5/041* (2013.01); *H02H 3/38* (2013.01)

(58) Field of Classification Search
CPC .. H02H 3/10; H02H 1/0007; H02H 5/04–048; H02H 3/08; H02H 3/085;
(Continued)

(56) References Cited

U.S. PATENT DOCUMENTS

2007/0159138 A1    7/2007    Furuuchi et al.
2011/0273137 A1    11/2011    Nakatsuji et al.
(Continued)

FOREIGN PATENT DOCUMENTS

CN    2130271 Y    4/1993
CN    1479424 A    3/2004
(Continued)

OTHER PUBLICATIONS

International Search Report for Application No. PCT/KR2019/009708 dated Nov. 21, 2019, 2 pages.
(Continued)

*Primary Examiner* — Jared Fureman
*Assistant Examiner* — Christopher J Clark
(74) *Attorney, Agent, or Firm* — Lerner, David, Littenberg, Krumholz & Mentlik, LLP

(57) ABSTRACT

A fuse control system and method using a defective mode detection, in which an overcurrent protective fuse and a signal fuse capable of performing a function under various conditions in order to protect a circuit are integrated. Thus, it is possible to protect the circuit even in states such as overvoltage, a high temperature, a low temperature, and other dangerous states in addition to an overcurrent state and a short-circuited state. In addition, it is possible to reduce a wide design space and design cost which result from various kinds of fuses being used in series, and to simplify a circuit configuration. Consequently, since circuit resistance is reduced, it is possible to have a positive influence on a battery.

13 Claims, 4 Drawing Sheets

(51) Int. Cl.
*H02H 5/04* (2006.01)
*H02H 3/10* (2006.01)
*H02H 3/38* (2006.01)

(58) Field of Classification Search
CPC .......... H02H 3/087; H02H 3/20; H02H 3/202; H02H 3/38; H02H 5/041; H01H 85/0047
See application file for complete search history.

(56) References Cited

U.S. PATENT DOCUMENTS

| | | | |
|---|---|---|---|
| 2014/0285935 A1* | 9/2014 | Tsai | H02H 3/087 361/86 |
| 2015/0303011 A1 | 10/2015 | Jung et al. | |
| 2017/0338645 A1* | 11/2017 | Wang | H02H 3/08 |
| 2018/0269698 A1 | 9/2018 | Kondo et al. | |
| 2019/0052257 A1 | 2/2019 | Song et al. | |
| 2019/0362924 A1* | 11/2019 | Zhou | H01H 85/165 |

FOREIGN PATENT DOCUMENTS

| | | |
|---|---|---|
| CN | 102273044 A | 12/2011 |
| CN | 108292841 A | 7/2018 |
| EP | 1533881 A2 | 5/2005 |
| EP | 3168960 A1 | 5/2017 |
| JP | S6044938 A | 3/1985 |
| JP | H07274378 A | 10/1995 |
| JP | 2001516125 A | 9/2001 |
| JP | 20060109596 A | 4/2006 |
| JP | 2008027826 A | 2/2008 |
| JP | 2008113505 A | 5/2008 |
| JP | 2010040282 A | 2/2010 |
| JP | 2015230740 A | 12/2015 |
| JP | 2018073779 A | 5/2018 |
| KR | 100312154 B1 | 11/2001 |
| KR | 20040086885 A | 10/2004 |
| KR | 20080082869 A | 9/2008 |
| KR | 20090048303 A | 5/2009 |
| KR | 101388354 B1 | 4/2014 |
| KR | 101514956 B1 | 4/2015 |
| KR | 101547439 B1 | 8/2015 |
| KR | 20170116472 A | 10/2017 |
| KR | 20180116625 A | 10/2018 |
| WO | 2004084249 A1 | 9/2004 |

OTHER PUBLICATIONS

Extended European Search Report for Application No. 19853943.9 dated Apr. 13, 2021, pp. 1-3.
Chinese Search Report for Application No. 201980006833.X dated Nov. 29, 2021, 3 pages.

* cited by examiner

PRIOR ART
[Figure 1]
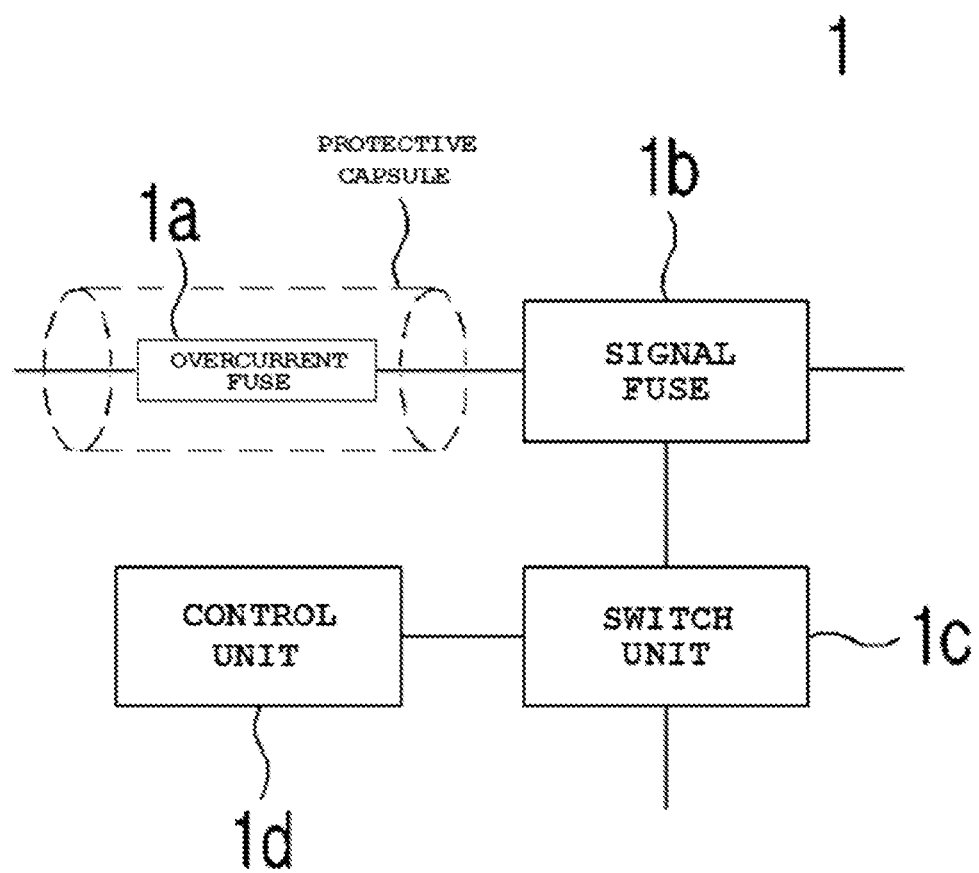

[Figure 2]
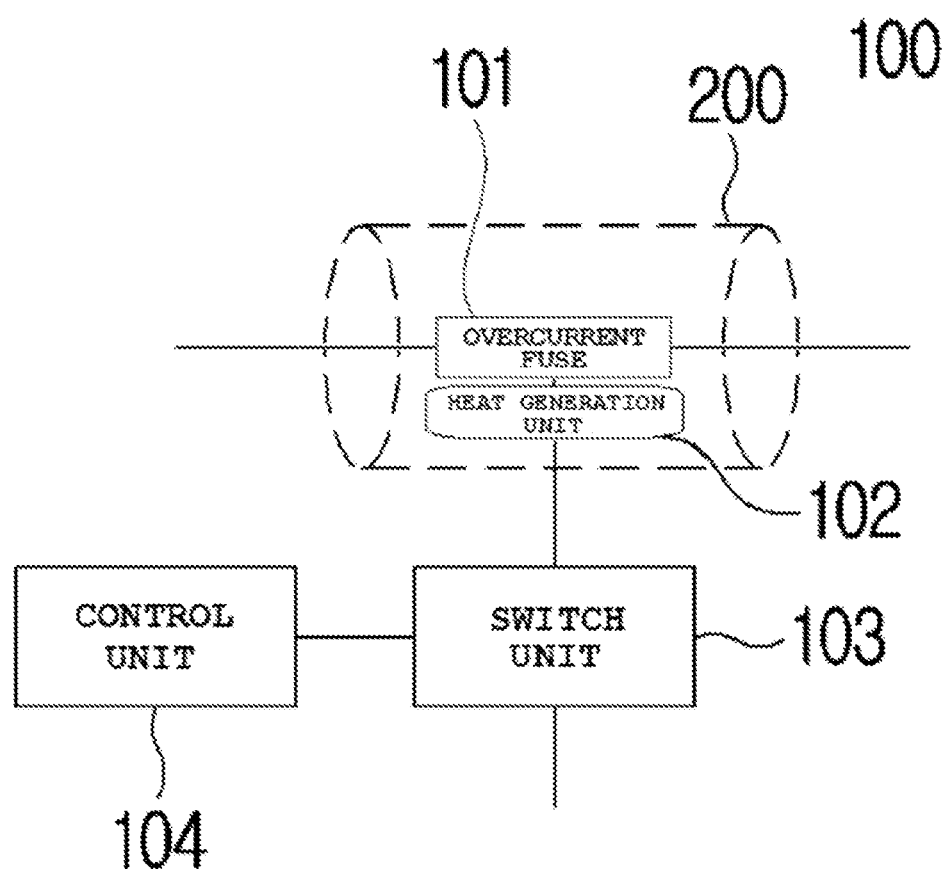

[Figure 3]
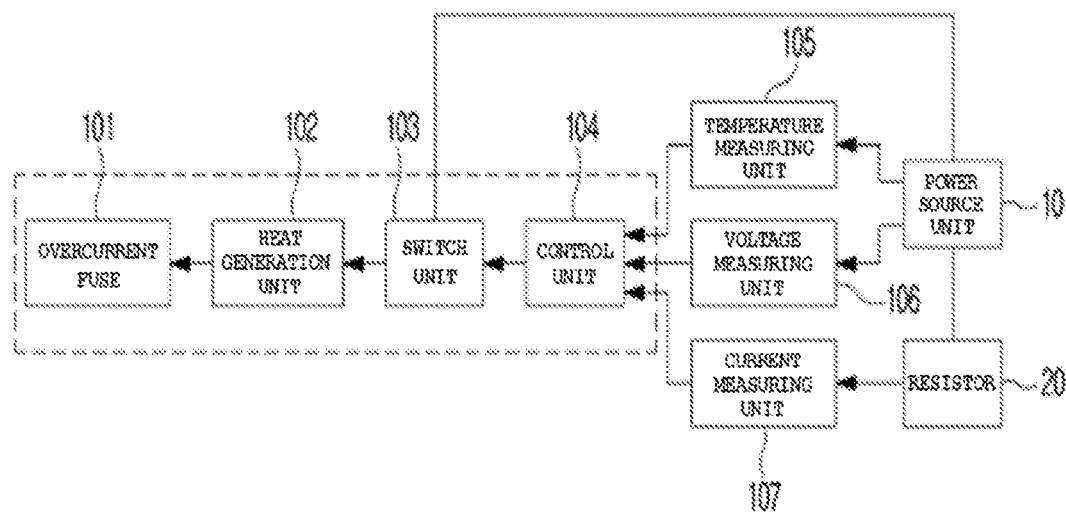
[Figure 4]
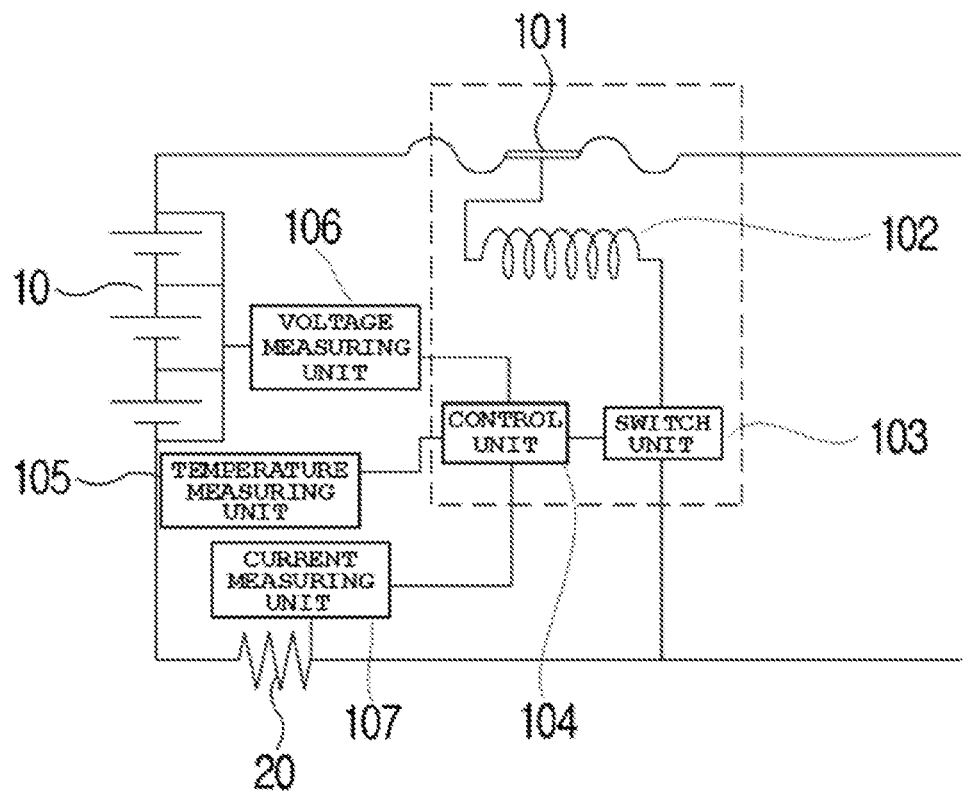

[Figure 5]
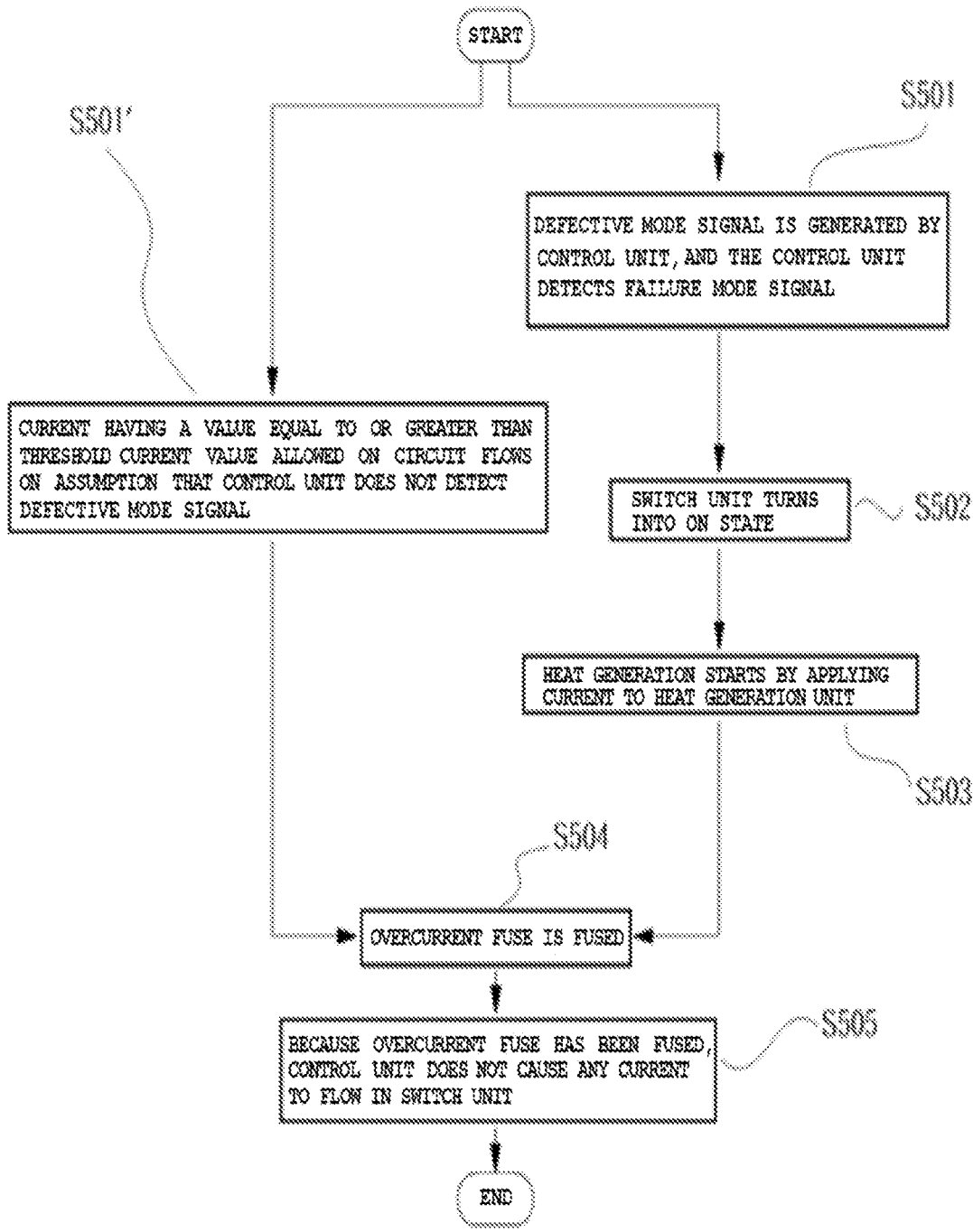

FUSE CONTROL SYSTEM AND METHOD USING DEFECTIVE MODE DETECTION

CROSS-REFERENCE TO RELATED APPLICATIONS

The present application is a national phase entry under 35 U.S.C. § 371 of International Application No. PCT/KR2019/009708 filed Aug. 5, 2019, published in Korean, which claims priority from Korean Patent Application No. 10-2018-0103915 filed Aug. 31, 2018, all of which are incorporated herein by reference.

TECHNICAL FIELD

This application claims priority to and the benefit of Korean Patent Application No. 10-2018-0103915 filed in the Korean Intellectual Property Office on Aug. 31, 2018, the entire contents of which are incorporated herein by reference.

The present invention relates to a fuse control system and method using a defective mode detection, and more particularly, to a fuse control system and method using a defective mode detection, in which an overcurrent protective fuse and a signal fuse are integrated, and thus it is possible to increase utilization of a space in a circuit design, to reduce design cost, and to improve efficiency of a battery by reducing circuit resistance.

BACKGROUND ART

In general, when a state such as overcurrent, overvoltage, a high temperature, and a low temperature, which exceeds a threshold value allowed on a circuit, occurs, a fuse is used to block a current conduction state for protecting an element on the circuit. At this time, an overcurrent fuse is used for blocking overcurrent, and a signal fuse is used for blocking the other above-described abnormal states.

Such an overcurrent fuse and a signal fuse are required to be connected in series in order to be disposed on one circuit. In this case, there are problems in that a design space increases, cost increases, and battery efficiency is reduced by increasing resistance, for examples.

SUMMARY

Technical Problem

To solve the above problems, the present invention has been made in an effort to provide a fuse control system and method using a defective mode detection, in which an overcurrent protective fuse and a signal fuse are integrated, and thus it is possible to increase utilization of a space in a circuit design, to reduce design cost, and to improve efficiency of a battery by reducing circuit resistance.

Technical Solution

According to an embodiment of the present invention, a fuse control system using a defective mode detection includes an overcurrent fuse which is configured to be fused when a value of a current flowing in a circuit is equal to or greater than a threshold value, a heat generator configured to generate heat to fuse the overcurrent fuse and that is located sufficiently close to overcurrent fuse to fuse the overcurrent fuse, a switch configured to change a conduction state of a current applied to the heat generator, and a controller configured to generate a defective mode signal and control an operation state of the switch to turn into an ON state when the defective mode signal is generated. The overcurrent fuse, the heat generator, the switch, and the controller are integrated to form a module.

In the embodiment, the fuse control system may further include a temperature sensor configured to measure a temperature of a power source in the circuit and transmit the measured temperature to the controller, a voltage sensor confgiured to measure a voltage of the power source in the circuit and transmit the measured voltage to the controller, and a current sensor configured to measure a current flowing in the circuit and transmit the measured current to the controller.

In the embodiment, the defective mode signal may include at least one of a first defective mode signal generated by the controller when the measured voltage is greater than a threshold voltage value, a second defective mode signal generated by the controller when the measured current is greater than a threshold current value, a third defective mode signal generated by the controller when the measured temperature is greater than a threshold temperature, or a fourth defective mode signal generated by the controller when the overcurrent fuse is manually fused and the first, second and third defective mode signals are not generated.

In the embodiment, the current sensor may be electrically connected to a resistor on the circuit so as to measure a current value of the resistor.

In the embodiment, when the overcurrent fuse has been fused, the controller may be configured to control the operation state of the switch to not turn into the ON state.

According to another embodiment of the present invention, a fuse control method using a defective mode detection includes generating, by a controller a defective mode signal, controlling, by the controller, an operation state of a switch to turn into an ON state when the defective mode signal is generated, applying a current to a heat generator by the operation state of the switch being controlled to be in the ON state, and fusing an overcurrent fuse by heat generated by the heat generator located sufficently close to the overcurrent fuse to fuse the overcurrent fuse when a value of a current flowing in a circuit is equal to or greater than a threshold value.

In the embodiment, the fuse control method may further include measuring by a temperature sensor a temperature of a power source in the circuit and transmitting by the temperature sensor, the measured temperature to the controller, measuring, by a voltage sensor, a voltage of the power source in the circuit and transmitting, by the voltage sensor, the measured voltage to the controller, measuring, by a current sensor, a current flowing in the circuit and transmitting, by the current sensor, the measured current to the controller.

In the embodiment, measuring of the current flowing in the circuit may include measuring, by the current sensor, a current value of a resistor on the circuit, wherein the current sensor is electrically connected to the resistor.

In the embodiment, controlling the operation state of the switch may include controlling, by the controller, the operation state of the switch to not turn into the ON state when the overcurrent fuse has been fused.

In one embodiment, generating the defective mode signal may be performed by the controller when at least one of: (i) the measured voltage is greater than a threshold voltage value, (ii) the measured current is greater than a threshold current value, (iii) the measured temperature is greater than a threshold temperature, or (iv) the overcurrent fuse is manually fused and a defective mode signal is not generated in response to conditions (i), (ii) or (iii).

Advantageous Effects

According to the embodiments of the present invention, in the fuse control system and method using the defective mode detection, a design in which a fusing mechanism of a signal fuse is integrated with a portion of the overcurrent fuse, which is to be melted, is made. Thus, a design space for the fuse in a circuit design is reduced, and thus there are advantages that it is possible to obtain an additional space, to reduce the total circuit design cost, and to improve efficiency of a battery by reducing circuit resistance.

BRIEF DESCRIPTION OF THE DRAWINGS

FIG. 1 is a diagram schematically illustrating a circuit (1) in the related art, in which an overcurrent fuse and a signal fuse are connected in series.

FIG. 2 is a diagram schematically illustrating a form of a fuse control system (100) using a defective mode detection according to an embodiment of the present invention.

FIG. 3 is a diagram illustrating a configuration of the fuse control system (100) using the defective mode detection in the embodiment of the present invention.

FIG. 4 is a diagram schematically illustrating a circuit diagram of the fuse control system (100) using the defective mode detection, which is illustrated in FIG. 3.

FIG. 5 is a flowchart illustrating a fuse control process performed by the fuse control system (100) using the defective mode detection, which is illustrated in FIG. 3.

DETAILED DESCRIPTION

Hereinafter, a preferred embodiment will be described for understanding the present invention. The following embodiment is just provided in order to make the present invention be understood easier, and thus the present invention is not limited by the embodiment.

FIG. 1 is a diagram schematically illustrating a circuit (1) in the related art, in which an overcurrent fuse and a signal fuse are connected in series.

In FIG. 1, in the circuit (1) in the related art, in which an overcurrent fuse and a signal fuse are connected in series, an overcurrent fuse (1a) and a signal fuse (1b) are connected to each other in series, and the signal fuse (1b) is connected to a switch unit (1c) and a control unit (1d).

More specifically, in the circuit (1) in which the overcurrent fuse and the signal fuse are connected in series, the overcurrent fuse (1a) which is fused when a current having a value exceeding a threshold value allowed in the circuit is generated, and the signal fuse (1b) which is fused when other conditions of exceeding a threshold value allowed in the circuit is satisfied (overvoltage, high temperature, low temperature, and the like) are disposed in series. Such in-line element arrangement has problems that efficiency in design cost is low because a large mounting space is required on a printed circuit board (PCB), and battery efficiency is affected because circuit resistance increases.

Here, the signal fuse (1b) may be referred to as a fuse capable of being fused by a method of receiving an external signal and autonomously generating heat in order to protect a circuit for various purposes.

FIG. 2 is a diagram schematically illustrating a form of a fuse control system (100) using a defective mode detection according to an embodiment of the present invention, FIG. 3 is a diagram illustrating a configuration of the fuse control system (100) using the defective mode detection in the embodiment of the present invention, and FIG. 4 is a diagram schematically illustrating a circuit diagram of the fuse control system (100) using the defective mode detection, which is illustrated in FIG. 3.

In FIGS. 2 to 4, the fuse control system (100) using the defective mode detection according to an embodiment of the present invention roughly includes an overcurrent fuse (101), a heat generation unit (102), a switch unit (103), and a control unit (104). In addition, in the embodiment, the fuse control system may further include a temperature measuring unit (105), a voltage measuring unit (106), and a current measuring unit (107).

The control unit (104) may be connected to the temperature measuring unit (105), the voltage measuring unit (106), and the current measuring unit (107). The temperature measuring unit (105) and the voltage measuring unit (106) may be connected to a power source unit (10) on a circuit. The current measuring unit (107) may be connected to a resistor (20) on the circuit.

Firstly, the overcurrent fuse (101) may be connected to the anode of the power source unit (10) on the circuit so as to function to protect various elements (not illustrated) mounted on the circuit in a manner that the fuse (101) is autonomously fused if overcurrent exceeding a current value allowed on the circuit flows.

The overcurrent fuse (101) may be fused by heat transferred from the heat generation unit (102) described later. Details will be described later.

The overcurrent fuse (101) is provided in a protective capsule (200) described later. The protective capsule (200) is an element which is filled with a filler such as sand and is capable of preventing circuit loss occurring by an explosion when a large energy difference occurs, or a large current is instantly generated by a voltage difference between both ends in the process of the overcurrent fuse (101) being fused.

The heat generation unit (102) is located close to the overcurrent fuse (101) and generates heat by applying a current from the switch unit (103) to the heat generation unit (102). The heat generation unit (102) and the overcurrent fuse (101) are connected to each other through a thermally-conductive conductor (for example, copper). Thus, heat generated by heating of the heat generation unit (102) is transferred to the overcurrent fuse (101) through the thermally-conductive conductor.

The switch unit (103) causes a current to flows into the heat generation unit (102) or not to flow into the heat generation unit (102), by a control operation of the control unit (104) described later.

Next, the control unit (104) has a function to transition an operation state of the switch unit (103) based on whether or not a defective mode signal is generated and then detected.

Here, when the defective mode signal is detected, the control unit (104) may control the operation state of the switch unit (103) to turn into an ON state. When the defective mode signal is not detected, the control unit (104) may control the operation state of the switch unit (103) to turn into an OFF state.

The defective mode signal may mean a signal generated from the control unit (104) when a value exceeding a threshold value (for a voltage, a current, or a temperature) allowed on the circuit is measured from at least one of the temperature measuring unit (105), the voltage measuring unit (106), and the current measuring unit (107) described later.

In addition, the defective mode signal may mean a signal autonomously generated by the control unit (104) when the overcurrent fuse (101) is required to be manually fused.

Further, the defective mode signal may include at least one of a first defective mode signal generated by the control unit when a measurement value obtained by measurement of the voltage measuring unit exceeds a threshold voltage value; a second defective mode signal generated by the control unit when a measurement value obtained by measurement of the current measuring unit exceeds a threshold current value; a third defective mode signal generated by the control unit when a measurement value obtained by measurement of the temperature measuring unit exceeds a threshold temperature; and a fourth defective mode signal autonomously generated by the control unit when the overcurrent fuse is required to be manually fused except for situations in which the first to third defective mode signals are generated.

Here, the first defective mode signal may mean a so-called overvoltage detection signal, that is, may mean a signal generated by the control unit (104) based on a value provided for the control unit (104) when the voltage measuring unit (106) measures a voltage value exceeding the threshold voltage value, from the power source unit (10).

In addition, the second defective mode signal may mean a so-called overcurrent detection signal, that is, may mean a signal generated by the control unit (104) based on a value provided for the control unit (104) when the current measuring unit (107) measures a current value exceeding the threshold current value, from the resistor (20).

In addition, the third defective mode signal may mean a so-called overtemperature detection signal, that is, may mean a signal generated by the control unit (104) based on a value provided for the control unit (104) when the temperature measuring unit (105) measures a temperature value exceeding the threshold temperature, from the power source unit (10).

Meanwhile, the fourth defective mode signal may mean not the signals generated based on the measurement values when the control unit (104) receives the measurement values from the temperature measuring unit (105), the voltage measuring unit (106), and the current measuring unit (107), but a signal autonomously generated by the control unit (104) in order to transition the state of the switch unit from the OFF state to the ON state, in a case where the overcurrent fuse (101) is required to be manually fused other than the situations in which the first to third defective mode signals are generated.

In other words, the control unit (104) controls the operation state of the switch unit (103) to turn into the ON state when at least any one of the first defective mode signal to the fourth defective mode signal is detected, and controls the operation state of the switch unit (103) to turn into the OFF state when none of the defective mode signals is detected.

Next, the temperature measuring unit (105) has a function to measure the temperature value of the power source unit (10) and then transmit the measured temperature value to the control unit (104).

Such a temperature measuring unit (105) is located close to the power source unit (10) and may be a temperature sensor configured to detect the temperature by a heat generation state of the close power source unit (10).

The voltage measuring unit (106) has a function to measure the voltage value of the power source unit (10) and then transmit the measured voltage value to the control unit (104).

The current measuring unit (107) has a function to measure the current value of a current flowing in the resistor (20) and then transmit the measured current value to the control unit (104). The control unit (104) may determine the ON or OFF state of the switch unit (103) based on the temperature measuring unit (105), the voltage measuring unit (106), and the current value provided from the current measuring unit (107), and may control the switch unit (103) in accordance with the determined state of the switch unit.

Next, a process of controlling the fuse by the fuse control system (100) using the defective mode detection will be described with reference to FIG. 5.

FIG. 5 is a flowchart illustrating a fuse control process performed by the fuse control system (100) using the defective mode detection, which is illustrated in FIG. 3.

In FIG. 5, firstly, the fusing mechanism of the overcurrent fuse may be divided into a case of fusing by the control unit and a case where the control unit does not detect the defective mode signal (for example, a case where a current having a value equal to or greater than the threshold current value allowed on the circuit flows).

Firstly, regarding the case of fusing by the control unit, the control unit detects a defective mode signal (S501) depending on a case where the defective mode signal is generated by the control unit when a temperature equal to or greater than a threshold value is measured from the power source unit, a voltage value equal to or greater than a threshold value is measured from the power source unit, or a current value equal to or greater than a threshold value is measured from the resistor, or a case where the defective mode signal is autonomously generated by the control unit. Then, the control unit controls the operation state of the switch unit to turn into the ON state (S502).

Then, a current is applied to the heat generation unit by transitioning the state of the switch unit to the ON state, and thus heat generation starts (S503). Then, the overcurrent fuse is fused by the generated heat (S504).

Meanwhile, on the assumption that the control unit does not have detected the defective mode signal, if a current having a value equal to or greater than a threshold current value allowed on the circuit flows (S501'), the overcurrent fuse itself is fused (S504).

Consequently, the overcurrent fuse is fused, and thus the control unit does not cause any current to flow in the switch unit (S505).

Hitherto, the present invention is described with the preferred embodiment, but the person skilled in the related art can understand that the present invention can be variously modified or changed in a range without departing from the gist and scope of the present invention described in the claims.

The invention claimed is:

1. A fuse control system using a defective mode detection, the system comprising:
   a protective capsule filled with an electrically non-conductive filler material;
   an overcurrent fuse positioned within the protective capsule and configured to be fused when a value of a current flowing in a circuit is equal to or greater than a threshold value;
   a heat generator positioned in the protective capsule and configured to generate heat to fuse the overcurrent fuse, wherein the heat generator is located sufficiently close to the overcurrent fuse to fuse the overcurrent fuse;
   a switch configured to change a conduction state of a current applied to the heat generator; and
   a controller configured to:
      generate a defective mode signal; and
      control an operation state of the switch to turn it into an ON state when the defective mode signal is generated, wherein the protective capsule, the overcurrent fuse, the heat generator, the switch, and the controller are integrated to form a module.

2. The fuse control system of claim 1, further comprising:
a temperature sensor configured to:
measure a temperature of a power source in the circuit; and
transmit the measured temperature to the controller;
a voltage sensor configured to:
measure a voltage of the power source in the circuit; and
transmit the measured voltage to the controller; and
a current sensor configured to:
measure a current flowing in the circuit; and
transmit the measured current to the controller.

3. The fuse control system of claim 2, wherein
the defective mode signal includes at least one of:
a first defective mode signal generated by the controller when the measured voltage is greater than a threshold voltage value;
a second defective mode signal generated by the controller when the measured current is greater than a threshold current value;
a third defective mode signal generated by the controller when the measured temperature is greater than a threshold temperature; or
a fourth defective mode signal generated by the controller in response to a condition that requires the overcurrent fuse to be fused other than the measured voltage being greater than the threshold voltage value, the measured current being greater than the threshold current value and the measured temperature being greater than the threshold temperature.

4. The fuse control system of claim 2, wherein
the current sensor is electrically connected to a resistor on the circuit so as to measure a current value of the resistor.

5. The fuse control system of claim 1, wherein
when the overcurrent fuse has been fused, the controller is configured to control the operation state of the switch to not turn into the ON state.

6. The fuse control system of claim 1, wherein the heat generator is connected to the overcurrent fuse by a thermally conductive element configured to transfer from the heat generator to the overcurrent fuse an amount of heat sufficient to fuse the overcurrent fuse.

7. The fuse control system of claim 6, wherein the filler material is sand, and wherein the thermally conductive element is copper.

8. The fuse control system of claim 1, wherein the switch and the controller are positioned outside of the protective capsule.

9. A fuse control method using a defective mode detection, the method comprising:
generating, by a controller, a defective mode signal;
controlling, by the controller, an operation state of a switch to turn it into an ON state when the defective mode signal is generated;
applying a current to a heat generator by the operation state of the switch being in the ON state; and
fusing an overcurrent fuse positioned in a protective capsule filled with an electrically non-conductive filler material by heat generated by the heat generator positioned in the protective capsule and located sufficiently close to the overcurrent fuse to fuse the overcurrent fuse when the defective mode signal is generated.

10. The fuse control method of claim 9, further comprising:
measuring, by a temperature sensor, a temperature of a power source in the circuit;
transmitting, by the temperature sensor, the measured temperature to the controller;
measuring, by a voltage sensor, a voltage of the power source in the circuit;
transmitting, by the voltage sensor, the measured voltage to the controller;
measuring, by a current sensor, a current flowing in the circuit; and
transmitting, by the current sensor, the measured current to the controller.

11. The fuse control method of claim 10, wherein
measuring of the current flowing in the circuit includes measuring, by the current sensor, a current value of a resistor on the circuit, wherein the current sensor is electrically connected to the resistor.

12. The fuse control method of claim 10, wherein generating the defective mode signal is performed by the controller when at least one of:
(i) the measured voltage is greater than a threshold voltage value;
(ii) the measured current is greater than a threshold current value;
(iii) the measured temperature is greater than a threshold temperature; or
(iv) a condition that requires the overcurrent fuse to be fused other than conditions (i), (ii) or (iii).

13. The fuse control method of claim 9, wherein
controlling the operation state of the switch includes controlling, by the controller, the operation state of the switch to not turn into the ON state when the overcurrent fuse has been fused.

* * * * *